(12) United States Patent
Song et al.

(10) Patent No.: US 11,650,117 B2
(45) Date of Patent: May 16, 2023

(54) SIX-DIMENSIONAL FORCE SENSOR WITH HIGH SENSITIVITY AND LOW INTER-DIMENSIONAL COUPLING

(71) Applicant: SOUTHEAST UNIVERSITY, Jiangsu (CN)

(72) Inventors: Aiguo Song, Jiangsu (CN); Shuyan Yang, Jiangsu (CN); Baoguo Xu, Jiangsu (CN); Ming Wei, Jiangsu (CN); Chunhui Wang, Jiangsu (CN); Fan Li, Jiangsu (CN); Yuhua Yao, Jiangsu (CN); Yanjun Li, Jiangsu (CN); Suinan Zhang, Jiangsu (CN); Qiong Jin, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 398 days.

(21) Appl. No.: 16/973,690

(22) PCT Filed: Apr. 22, 2020

(86) PCT No.: PCT/CN2020/086154
§ 371 (c)(1),
(2) Date: Dec. 9, 2020

(87) PCT Pub. No.: WO2021/169011
PCT Pub. Date: Sep. 2, 2021

(65) Prior Publication Data
US 2021/0293642 A1  Sep. 23, 2021

(30) Foreign Application Priority Data
Feb. 25, 2020  (CN) .......................... 202010115277.4

(51) Int. Cl.
*G01L 5/00* (2006.01)
*G01L 5/1627* (2020.01)
*G01L 1/22* (2006.01)

(52) U.S. Cl.
CPC .......... *G01L 5/1627* (2020.01); *G01L 1/2262* (2013.01)

(58) Field of Classification Search
CPC ........................... G01L 5/1627; G01L 1/2262
See application file for complete search history.

(56) References Cited

U.S. PATENT DOCUMENTS

| | | | | |
|---|---|---|---|---|
| 3,927,560 A | * | 12/1975 | Farr | ...... G01L 1/2243 73/862.633 |
| 4,448,083 A | | 5/1984 | Hayashi | |
| 4,951,510 A | * | 8/1990 | Holm-Kennedy | ...... G01P 15/0802 73/514.31 |
| 5,490,427 A | * | 2/1996 | Yee | ...... G01L 5/162 73/781 |

(Continued)

FOREIGN PATENT DOCUMENTS

| | | |
|---|---|---|
| CN | 103940544 A | 7/2014 |
| CN | 106644233 A | 5/2017 |
| CN | 107131983 A | 9/2017 |
| CN | 1 08981987 A | 12/2018 |
| CN | 208704939 U | 4/2019 |
| EP | 0132163 A1 | 1/1985 |

*Primary Examiner* — Max H Noori
(74) *Attorney, Agent, or Firm* — Muncy, Geissler, Olds & Lowe, P.C.

(57) ABSTRACT

The present invention discloses a six-dimensional force sensor with high sensitivity and low inter-dimensional coupling, including a clockwise or counterclockwise swastika-shaped beam, vertical beams, a rectangular outer frame, and strain gauges; the clockwise or counterclockwise swastika-shaped beam includes a cross-shaped transverse beam and (Continued)

four rectangular transverse beams; a center of the cross-shaped transverse beam is provided with several force application holes used for applying forces and moments; four tail ends of the cross-shaped transverse beam are each connected to one of the rectangular transverse beams to form a clockwise or counterclockwise swastika-shaped structure; a top end of a vertical beam is connected to a tail end of a corresponding rectangular transverse beam, and bottom ends of the vertical beams are connected to the rectangular outer frame; and there are a plurality of strain gauges to form six groups of Wheatstone bridges that are respectively used for measuring an X-direction force, a Y-direction force, a Z-direction force, an X-direction moment, a Y-direction moment, and a Z-direction moment. Strain gauges for measuring the forces are all pasted on the cross-shaped transverse beam, strain gauges for measuring the X-direction moment and the Y-direction moment are all pasted on the four rectangular transverse beams, and strain gauges for measuring the Z-direction moment are all pasted on the four vertical beams. According to the present invention, the structure is simple, and inter-dimensional coupling is low while high sensitivity is ensured.

9 Claims, 2 Drawing Sheets

(56) References Cited

U.S. PATENT DOCUMENTS

| | | | | |
|---|---|---|---|---|
| 6,532,830 | B1* | 3/2003 | Jansen | G01L 5/1627 73/862.042 |
| 2006/0037409 | A1 | 2/2006 | Ichige | |
| 2013/0319135 | A1* | 12/2013 | Okada | G01L 1/2206 73/862.043 |
| 2015/0075250 | A1* | 3/2015 | Kosa | G01L 25/00 73/862.041 |
| 2017/0276559 | A1* | 9/2017 | Castano Cano | G01L 5/167 |
| 2019/0162607 | A1* | 5/2019 | Castano Cano | G01L 1/162 |
| 2019/0187010 | A1* | 6/2019 | Knickerbocker | G01L 1/225 |
| 2020/0289216 | A1* | 9/2020 | Denlinger | A61B 34/76 |

* cited by examiner

SIX-DIMENSIONAL FORCE SENSOR WITH HIGH SENSITIVITY AND LOW INTER-DIMENSIONAL COUPLING

BACKGROUND

Technical Field

The present invention relates to a force sensor, and in particular, to a six-dimensional force sensor with high sensitivity and low inter-dimensional coupling.

Related Art

A six-dimensional force sensor can measure force components Fx, Fy, and Fz of three dimensions and moment components Mx, My, and Mz of three dimensions in a spatial coordinate system, and has a wide range of application requirements in the fields of intelligent robot, aerospace, chemical industry, automobile and medical treatment. A six-dimensional force sensor based on a principle of resistance strain is currently most widely applied. The sensor is subject to a force to generate strain and the strain is converted into voltage change by using a strain gauge, so as to implement force/moment measurement.

Since the six-dimensional force sensor needs to be sensitive to forces/moments in six dimensions, a structure of the sensor directly affects the sensitivity and accuracy of measurement. Structures of six-dimensional force sensors are mainly divided into two types: a vertical beam type and a transverse beam type.

Typical vertical beam structures include six-dimensional force sensors developed by Draper Laboratory and Sunrise Instruments (SRI). The six-dimensional force sensor developed by the former is integrally formed and has a simple structure, but has very large inter-dimensional coupling. The six-dimensional force sensor developed by the latter is composed of 8 narrow and long vertical beams, and has very small inter-dimensional coupling, but it is relatively difficult to machine, and an error is easy to be introduced in a machining process. Because the vertical beam structure has a contradiction in terms of volume, machining accuracy, and inter-dimensional coupling, an existing six-dimensional force sensor generally uses a transverse beam structure.

A main problem to be resolved in the transverse beam structure is how to reduce interference of inter-dimensional coupling. Invention patent CN208704939U discloses a six-dimensional force sensor with low inter-dimensional coupling, but a structure thereof fails to implement complete decoupling between forces and moments. A six-dimensional force sensor disclosed by Chinese patent CN106644233A and a six-dimensional force sensor disclosed by Chinese patent CN107131983A both effectively reduce inter-dimensional coupling. However, the former uses a combination of a cylindrical structure and a cross beam structure, and therefore sensitivity is relatively low; and the latter uses a double-layer cross beam structure, and therefore it is relatively difficult to machine and paste.

SUMMARY

For the foregoing shortcomings of the prior art, a technical problem is to be resolved by providing a six-dimensional force sensor with high sensitivity and low inter-dimensional coupling according to the present invention. The six-dimensional force sensor with high sensitivity and low inter-dimensional coupling has advantages such as a simple structure and low inter-dimensional coupling while ensuring high sensitivity.

To resolve the foregoing technical problem, a technical solution used in the present invention is as follows:

A six-dimensional force sensor with high sensitivity and low inter-dimensional coupling includes a clockwise or counterclockwise swastika-shaped beam, vertical beams, a rectangular outer frame, and strain gauges.

The clockwise or counterclockwise swastika-shaped beam includes a cross-shaped transverse beam and four rectangular transverse beams. A center of the cross-shaped transverse beam is provided with several force application holes used for applying forces and moments. Straight lines on which two transverse beams that form the cross-shaped transverse beam are located are used as an X direction and a Y direction, and a direction perpendicular to the cross-shaped transverse beam is a Z direction. Four tail ends of the cross-shaped transverse beam are each connected to one of the rectangular transverse beams to form a clockwise or counterclockwise swastika-shaped structure.

There are four vertical beams disposed in the Z direction, a top end of a vertical beam is connected to a tail end of a corresponding rectangular transverse beam, and bottom ends of the vertical beams are connected to the rectangular outer frame.

There are a plurality of strain gauges to form six groups of Wheatstone bridges that are respectively used for measuring an X-direction force, a Y-direction force, a Z-direction force, an X-direction moment, a Y-direction moment, and a Z-direction moment and that are marked as an Fx Wheatstone bridge, an Fy Wheatstone bridge, an Fz Wheatstone bridge, an Mx Wheatstone bridge, an My Wheatstone bridge, and an Mz Wheatstone bridge in sequence.

Strain gauges that form the Fx Wheatstone bridge, the Fy Wheatstone bridge, and the Fz Wheatstone bridge are all pasted on the cross-shaped transverse beam, strain gauges that form the Mx Wheatstone bridge and the My Wheatstone bridge are all pasted on the four rectangular transverse beams, and strain gauges that form the Mz Wheatstone bridge are all pasted on the four vertical beams.

Longitudinal sections of the cross-shaped transverse beam, the rectangular transverse beam, and the rectangular outer frame, and a cross section of the vertical beam are all squares.

The rectangular outer frame is a framework internally provided with a rectangular slot, and the bottom ends of the vertical beams are respectively connected to four sides of the rectangular outer frame. Four corners of the rectangular outer frame are each provided with a fixing hole connected to a housing.

Strain gauges that form the Fx Wheatstone bridge are respectively R1, R2, R3, and R4. Assuming that the two transverse beams that form the cross-shaped transverse beam are respectively an X-direction transverse beam and a Y-direction transverse beam, the strain gauge R1 and the strain gauge R2 are pasted on a left side wall and a right side wall of the Y-direction transverse beam in a positive direction, and the strain gauge R3 and the strain gauge R4 are pasted on a left side wall and a right side wall of the Y-direction transverse beam in a negative direction.

Strain gauges that form the Fy Wheatstone bridge are respectively R5, R6, R7, and R8. The strain gauge R5 and the strain gauge R6 are pasted on a left side wall and a right side wall of the X-direction transverse beam in a positive direction, and the strain gauge R7 and the strain gauge R8 are pasted on a left side wall and a right side wall of the X-direction transverse beam in a negative direction.

Strain gauges that form the Fz Wheatstone bridge are respectively R9, R10, R11, R12, R13, R14, R15, and R16. The eight strain gauges are symmetrically pasted on upper surfaces and lower surfaces of four directional beams in the cross-shaped transverse beam.

Strain gauges that form the Mx Wheatstone bridge are respectively R17, R18, R19, and R20. The strain gauge R17 and the strain gauge R18 are pasted on an upper surface and a lower surface of a rectangular transverse beam connected to the Y-direction transverse beam in the positive direction, and the strain gauge R19 and the strain gauge R20 are pasted on an upper surface and a lower surface of a rectangular transverse beam connected to the Y-direction transverse beam in the negative direction.

Strain gauges that form the My Wheatstone bridge are respectively R21, R22, R23, and R24. The strain gauge R21 and the strain gauge R22 are pasted on an upper surface and a lower surface of a rectangular transverse beam connected to the X-direction transverse beam in the negative direction, and the strain gauge R23 and the strain gauge R24 are pasted on an upper surface and a lower surface of a rectangular transverse beam connected to the X-direction transverse beam in the positive direction.

Strain gauges that form the Mz Wheatstone bridge are respectively R25, R26, R27, R28, R29, R30, R31, and R32. The eight strain gauges are pasted in pairs on symmetrical wall surfaces of the four vertical beams.

The present invention has the following beneficial effects.

1. Based on a principle of resistance strain, each sensitive parts uses a rectangular beam structure and uses no rigid cylindrical structure, the deformation amount is large, and resistance of strain gauges changes greatly, so that measurement sensitivity is high.

2. The strain gauges for measuring forces and moments are designed to be on different beams by using a structural design combining a clockwise or counterclockwise swastika-shaped beam and vertical beams, so that interference of inter-dimensional coupling between forces and moments is effectively reduced, and the measurement accuracy is high.

3. An overall structure is simple, it is easy to machine, and it is easy to paste the strain gauges.

BRIEF DESCRIPTION OF THE DRAWINGS

FIG. 4-1, FIG. 4-2, FIG. 4-3, FIG. 4-4, FIG. 4-5 and FIG. 4-6 are respectively schematic diagrams of an Fx Wheatstone bridge, an Fy Wheatstone bridge, an Fz Wheatstone bridge, an Mx Wheatstone bridge, an My Wheatstone bridge, and an Mz Wheatstone bridge, where:

1, rectangular outer frame; 2, force application hole; 3, vertical beam; 4, rectangular transverse beam; 5, cross-shaped transverse beam; 6, fixing hole; and 7, strain gauge.

DETAILED DESCRIPTION

The following further describes the present invention in detail with reference to the accompanying drawings and exemplary embodiments.

In the description of the present invention, it should be understood that orientation or position relationships indicated by the terms such as "left side", "right side", "upper portion", and "lower portion" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation, and "first", "second", or the like does not indicate the importance of the component. Therefore, such terms should not be construed as limiting of the present invention. A specific size used in an embodiment is merely used for describing an example of the technical solution and does not limit the protection scope of the present invention.

Figure 1:
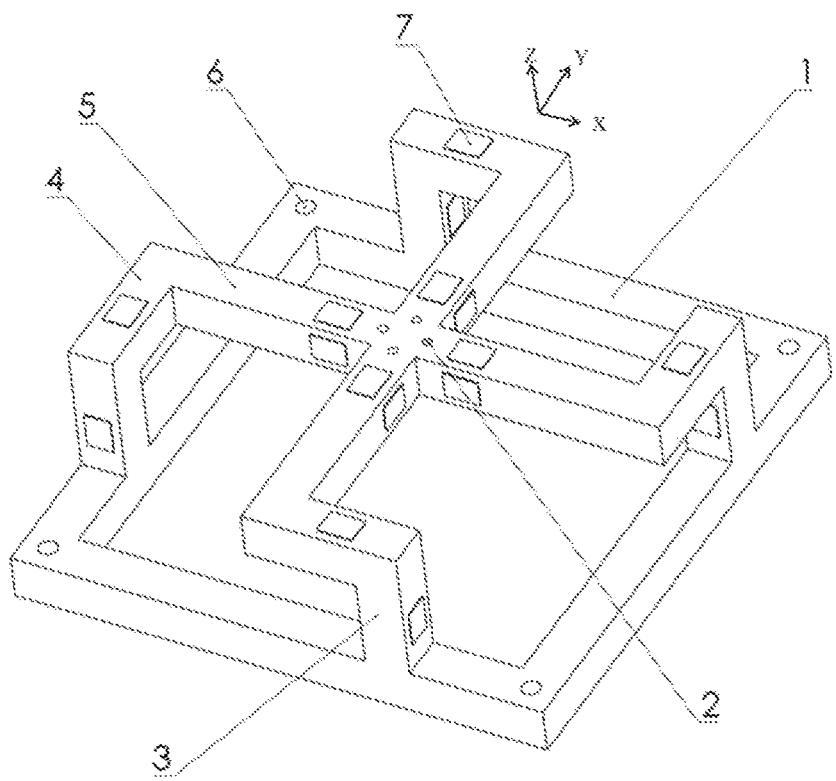
FIG. 1 is a schematic diagram of an overall structure of a six-dimensional force sensor with high sensitivity and low inter-dimensional coupling according to the present invention.

In this embodiment, there is preferably a clockwise or counterclockwise swastika-shaped structure. As shown in FIG. 1, a six-dimensional force sensor with high sensitivity and low inter-dimensional coupling includes a clockwise or counterclockwise swastika-shaped beam, vertical beams 3, a rectangular outer frame 1, and strain gauges 7.

The clockwise or counterclockwise swastika-shaped beam includes a cross-shaped transverse beam 5 and four rectangular transverse beams 4. A center of the cross-shaped transverse beam is preferably provided with four force application holes 2 used for applying forces and moments.

Straight lines on which two transverse beams that form the cross-shaped transverse beam are located are used as an X direction and a Y direction, and a direction perpendicular to the cross-shaped transverse beam is a Z direction. In addition, the two transverse beams forming the cross-shaped transverse beam are respectively referred to as an X-direction transverse beam and a Y-direction transverse beam.

Four tail ends of the cross-shaped transverse beam are each connected to one of the rectangular transverse beams to form a clockwise or counterclockwise swastika-shaped structure.

There are four vertical beams disposed in the Z direction, a top end of a vertical beam is connected to a tail end of a corresponding rectangular transverse beam, and bottom ends of the vertical beams are connected to the rectangular outer frame.

The rectangular outer frame is a framework internally provided with a rectangular slot, and the bottom ends of the vertical beams are respectively connected to four sides of the rectangular outer frame. Four corners of the rectangular outer frame are each provided with a fixing hole 6, and the sensor is fixed on a housing through the fixing holes 6.

Longitudinal sections of the cross-shaped transverse beam, the rectangular transverse beam, and the rectangular outer frame, and a cross section of the vertical beam are all preferably squares.

There are a plurality of strain gauges. In this embodiment, there are preferably a total of 32 strain gauges, whose corresponding serial numbers are respectively R1 to R32. All the strain gauges are identical except for the serial numbers, that is, the strain gauges have the same initial resistance value. The resistance value decreases during contraction, and the resistance value increases during expansion.

The foregoing 32 strain gauges form six groups of Wheatstone bridges that are respectively used for measuring an X-direction force, a Y-direction force, a Z-direction force, an X-direction moment, a Y-direction moment, and a Z-direction moment and that are marked as an Fx Wheatstone bridge, an Fy Wheatstone bridge, an Fz Wheatstone bridge, an Mx Wheatstone bridge, an My Wheatstone bridge, and an Mz Wheatstone bridge in sequence.

Strain gauges that form the Fx Wheatstone bridge, the Fy Wheatstone bridge, and the Fz Wheatstone bridge are all pasted on the cross-shaped transverse beam, strain gauges that form the Mx Wheatstone bridge and the My Wheatstone bridge are all pasted on the four rectangular transverse beams, and strain gauges that form the Mz Wheatstone bridge are all pasted on the four vertical beams. Further, the strain gauges are preferably pasted on positions on which strain is the greatest when corresponding beams are subject to forces, and the positions on which strain is the greatest are obtained through finite element simulation.

Figure 2:
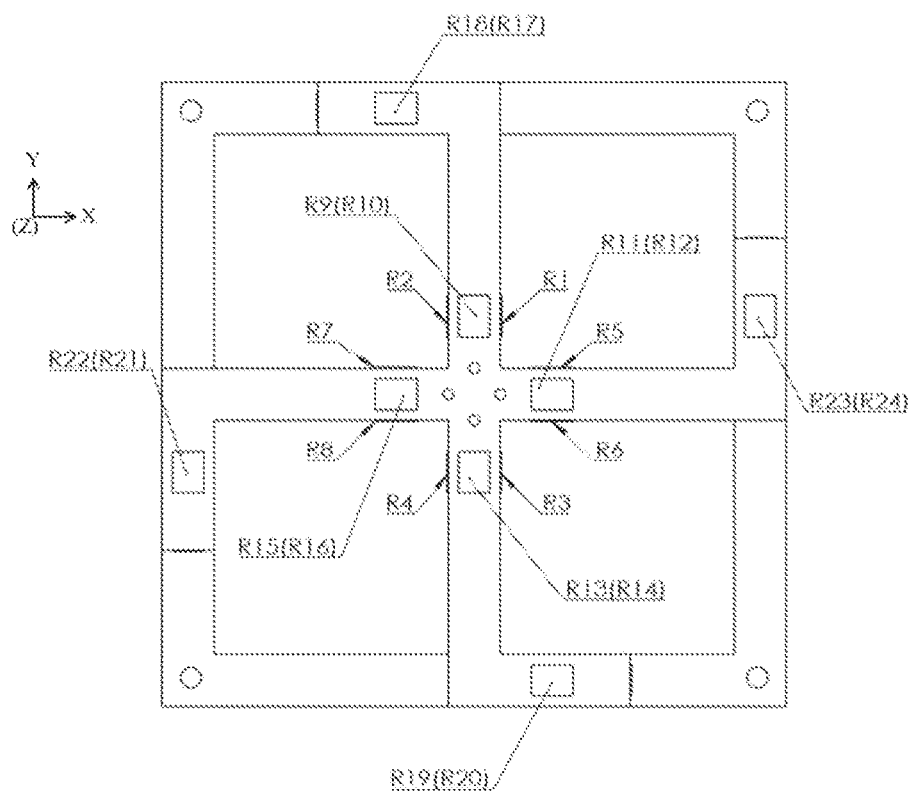
FIG. 2 is a schematic diagram 1 of a position on which a strain gauge is pasted according to the present invention.

As shown in FIG. 2, strain gauges that form the Fx Wheatstone bridge are respectively R1, R2, R3, and R4. The strain gauge R1 and the strain gauge R2 are pasted on a left side wall and a right side wall of the Y-direction transverse beam in a positive direction and are symmetrical with respect to a Y axis, and the strain gauge R3 and the strain gauge R4 are pasted on a left side wall and a right side wall of the Y-direction transverse beam in a negative direction. A group of R1 and R2 and a group of R3 and R4 are symmetrical with respect to an X axis.

Strain gauges that form the Fy Wheatstone bridge are respectively R5, R6, R7, and R8. The strain gauge R5 and the strain gauge R6 are pasted on a left side wall and a right side wall of the X-direction transverse beam in a positive direction and are symmetrical with respect to the X axis, and the strain gauge R7 and the strain gauge R8 are pasted on a left side wall and a right side wall of the X-direction transverse beam in a negative direction. A group of R5 and R6 and a group of R7 and R8 are symmetrical with respect to the Y axis.

Strain gauges that form the Fz Wheatstone bridge are respectively R9, R10, R11, R12, R13, R14, R15, and R16. The eight strain gauges are symmetrically pasted on upper surfaces and lower surfaces of four directional beams in the cross-shaped transverse beam and are symmetrical with respect to the X axis or the Y axis.

Strain gauges that form the Mx Wheatstone bridge are respectively R17, R18, R19, and R20. The strain gauge R17 and the strain gauge R18 are pasted on an upper surface and a lower surface of a rectangular transverse beam connected to the Y-direction transverse beam in the positive direction, and the strain gauge R19 and the strain gauge R20 are pasted on an upper surface and a lower surface of a rectangular transverse beam connected to the Y-direction transverse beam in the negative direction. Pasting positions of R17 and R18 and pasting positions of R19 and R20 are centrally symmetrical.

Strain gauges that form the My Wheatstone bridge are respectively R21, R22, R23, and R24. The strain gauge R21 and the strain gauge R22 are pasted on an upper surface and a lower surface of a rectangular transverse beam connected to the X-direction transverse beam in the negative direction, and the strain gauge R23 and the strain gauge R24 are pasted on an upper surface and a lower surface of a rectangular transverse beam connected to the X-direction transverse beam in the positive direction. Pasting positions of R21 and R22 and pasting positions of R23 and R24 are centrally symmetrical.

Figure 3:
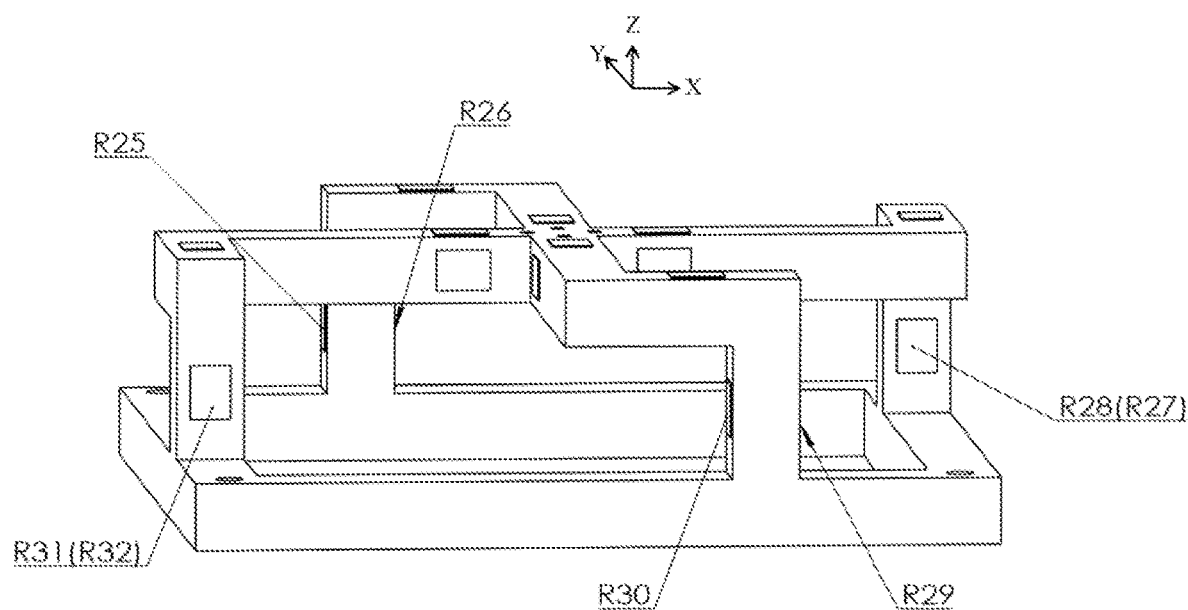
FIG. 3 is a schematic diagram 2 of a position on which a strain gauge is pasted according to the present invention.

As shown in FIG. 3, strain gauges that form the Mz Wheatstone bridge are respectively R25, R26, R27, R28, R29, R30, R31, and R32. The eight strain gauges are pasted in pairs on symmetrical wall surfaces of the four vertical beams.

Figure 4:
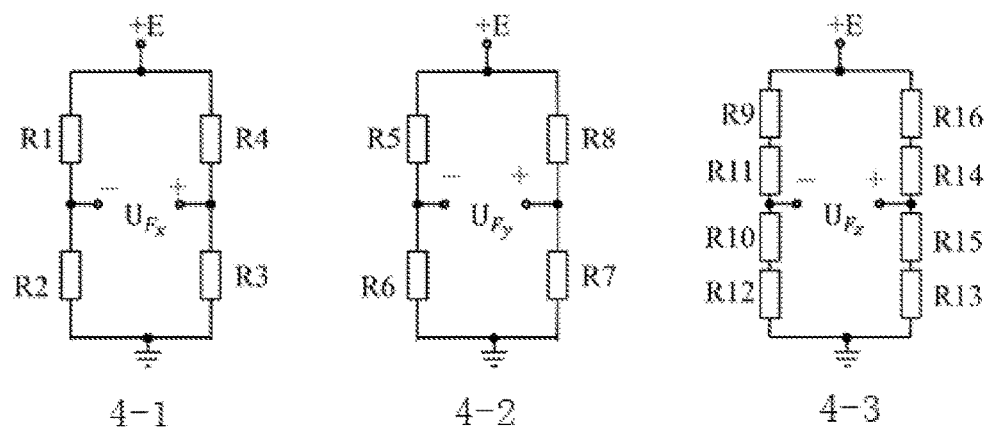
FIG. 4 is a schematic diagram of circuits of six groups of Wheatstone bridges according to the present invention.
Figure 4:
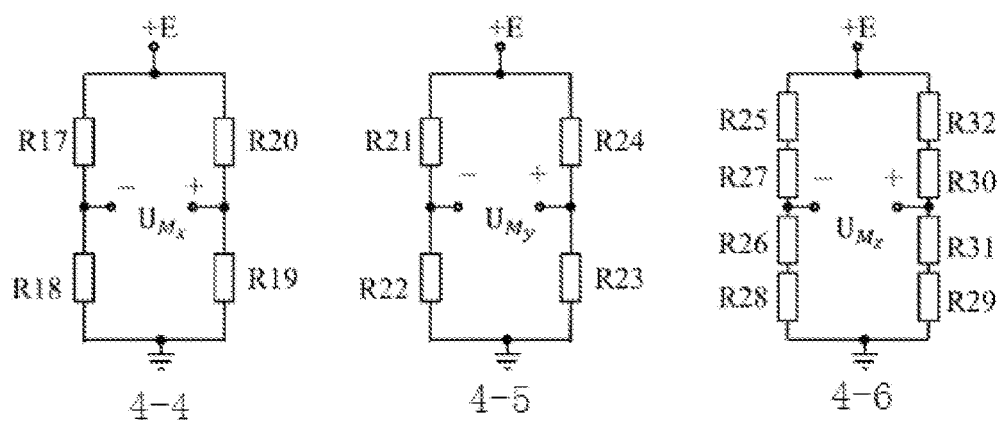

Six groups of Wheatstone bridges formed by strain gauges of six channels are shown in FIG. 4. Strain gauges R1, R2, R3, and R4 form a Wheatstone bridge for measuring an X-direction force Fx; strain gauges R5, R6, R7, and R8 form a Wheatstone bridge for measuring a Y-direction force Fy; strain gauges R9, R10, R11, R12, R13, R14, R15, and R16 form a Wheatstone bridge for measuring a Z-direction force Fz; strain gauges R17, R18, R19, and R20 form a Wheatstone bridge for measuring an X-direction moment Mx; strain gauges R21, R22, R23, and R24 form a Wheatstone bridge for measuring a Y-direction moment My; strain gauges R25, R26, R27, R28, R29, R30, R31, and R32 form a Wheatstone bridge for measuring a Z-direction moment Mz.

A measurement principle of the six-dimensional force sensor is: an inputted force/moment in a particular dimension acts on a center of the cross-shaped transverse beam 5 through the force application hole 2, causing the sensor to deform, and a resistance value of a strain gauge at a corresponding position changes, causing an output voltage of a corresponding bridge to change. In addition, due to a structure and a circuit design, output voltages in remaining dimensions do not significantly change, which effectively reduces interference of inter-dimensional coupling, thereby improving the measurement accuracy of the sensor. Therefore, in a process of using, a force/moment value in each dimension can be obtained by only measuring voltage change amounts of all the six channels.

Assuming that R0 represents the initial resistance value of a strain gauge, and $\Delta R_{F_x}$, $\Delta R_{F_y}$, $\Delta R_{F_z}$, $\Delta R_{M_x}$, $\Delta R_{M_y}$, and $\Delta R_{M_z}$ respectively represent resistance value change amounts of the strain gauge under the action of Fx, Fy, Fz, Mx, My, and Mz, change amounts of output voltages of the channels are shown in the following formulas:

$$\Delta U_{F_x} = \frac{R3 + \Delta R_{F_x}}{R3 + R4} - \frac{R2 + \Delta R_{F_x}}{R1 + R2} = \frac{R0 + \Delta R_{F_x}}{2R0} - \frac{R0 + \Delta R_{F_x}}{2R0} = \frac{\Delta R_{F_x}}{R0}E$$

$$\Delta U_{F_y} = \frac{R7 + \Delta R_{F_y}}{R7 + R8} - \frac{R6 + \Delta R_{F_y}}{R5 + R6} = \frac{R0 + \Delta R_{F_y}}{2R0} - \frac{R0 + \Delta R_{F_y}}{4R0} = \frac{\Delta R_{F_y}}{R0}E$$

$$\Delta U_{F_z} = \frac{R13 + R15 + 2\Delta R_{F_z}}{R13 + R14 + R15 + R16} - \frac{R10 + R12 + 2\Delta R_{F_z}}{R10 + R11 + R12 + R13} =$$
$$\frac{2R0 + 2\Delta R_{F_z}}{4R0} - \frac{2R0 + 2\Delta R_{F_z}}{4R0} = \frac{\Delta R_{F_z}}{R0}E$$

$$\Delta U_{M_x} =$$
$$\frac{R19 + R_{M_x}}{R19 + R20} - \frac{R18 + \Delta R_{M_x}}{R17 + R18} = \frac{R0 + \Delta R_{M_x}}{2R0} - \frac{R0 + \Delta R_{M_x}}{2R0} = \frac{\Delta R_{M_x}}{R0}E$$

$$\Delta U_{M_y} =$$
$$\frac{R23 + \Delta R_{M_y}}{R23 + R24} - \frac{R22 + \Delta R_{M_y}}{R21 + R22} = \frac{R0 + \Delta R_{M_y}}{2R0} - \frac{R0 - \Delta R_{M_y}}{2R0} = \frac{\Delta R_{M_y}}{R0}E$$

$$\Delta U_{M_z} = \frac{R29 + R31 + 2\Delta R_{M_z}}{R29 + R30 + R31 + R32} - \frac{R26 + R28 + 2\Delta R_{M_z}}{R25 + R26 + R27 + R28} =$$
$$\frac{2R0 + 2\Delta R_{M_z}}{4R0} - \frac{2R0 + 2\Delta R_{M_z}}{4R0} = \frac{\Delta R_{M_z}}{R0}E$$

In the foregoing formulas, $\Delta U_{F_x}$, $\Delta U_{F_y}$, $\Delta U_{F_z}$, $\Delta U_{M_x}$, $\Delta U_{M_y}$, and $\Delta U_{M_z}$ respectively represent change amounts of the output voltages corresponding to the channels under the action of Fx, Fy, Fz, Mx, My, and Mz. In addition, E represents a power supply voltage shown in FIG. 4.

The exemplary implementations of the present invention have been described in detail above, but the present invention is not limited to the specific details in the above implementations, and various equivalent variations may be made to the technical solution of the present invention within the scope of the technical idea of the present invention. Such equivalent variations are all within the protection scope of the present invention.

What is claimed is:

1. A six-dimensional force sensor with high sensitivity and low inter-dimensional coupling, comprising: a clockwise or counterclockwise swastika-shaped beam, vertical beams, a rectangular outer frame, and strain gauges, wherein
the clockwise or counterclockwise swastika-shaped beam comprises a cross-shaped transverse beam and four rectangular transverse beams; a center of the cross-shaped transverse beam is provided with several force application holes used for applying forces and moments; straight lines on which two transverse beams that form the cross-shaped transverse beam are located are used as an X direction and a Y direction, and a direction perpendicular to the cross-shaped transverse beam is a Z direction; four tail ends of the cross-shaped transverse beam are each connected to one of the rectangular transverse beams to form a clockwise or counterclockwise swastika-shaped structure;
there are four vertical beams disposed in the Z direction, a top end of a vertical beam is connected to a tail end of a corresponding rectangular transverse beam, and bottom ends of the vertical beams are connected to the rectangular outer frame; and
there are a plurality of strain gauges to form six groups of Wheatstone bridges that are respectively used for measuring an X-direction force, a Y-direction force, a Z-direction force, an X-direction moment, a Y-direction moment, and a Z-direction moment and that are marked as an Fx Wheatstone bridge, an Fy Wheatstone bridge, an Fz Wheatstone bridge, an Mx Wheatstone bridge, an My Wheatstone bridge, and an Mz Wheatstone bridge in sequence, wherein
strain gauges that form the Fx Wheatstone bridge, the Fy Wheatstone bridge, and the Fz Wheatstone bridge are all pasted on the cross-shaped transverse beam, strain gauges that form the Mx Wheatstone bridge and the My Wheatstone bridge are all pasted on the four rectangular transverse beams, and strain gauges that form the Mz Wheatstone bridge are all pasted on the four vertical beams.

2. The six-dimensional force sensor with high sensitivity and low inter-dimensional coupling according to claim 1, wherein longitudinal sections of the cross-shaped transverse beam, the rectangular transverse beam, and the rectangular outer frame, and a cross section of the vertical beam are all squares.

3. The six-dimensional force sensor with high sensitivity and low inter-dimensional coupling according to claim 2, wherein the rectangular outer frame is a framework internally provided with a rectangular slot, and the bottom ends of the vertical beams are respectively connected to four sides of the rectangular outer frame; and four corners of the rectangular outer frame are each provided with a fixing hole connected to a housing.

4. The six-dimensional force sensor with high sensitivity and low inter-dimensional coupling according to claim 1, wherein strain gauges that form the fix Wheatstone bridge are respectively R1, R2, R3, and R4; and assuming that the two transverse beams that form the cross-shaped transverse beam are respectively an X-direction transverse beam and a Y-direction transverse beam, the strain gauge R1 and the strain gauge R2 are pasted on a left side wall and a right side wall of the Y-direction transverse beam in a positive direction, and the strain gauge R3 and the strain gauge R4 are pasted on a left side wall and a right side wall of the Y-direction transverse beam in a negative direction.

5. The six-dimensional force sensor with high sensitivity and low inter-dimensional coupling according to claim 4, wherein strain gauges that form the Fy Wheatstone bridge are respectively R5, R6, R7, and R8; and the strain gauge R5 and the strain gauge R6 are pasted on a left side wall and a right side wall of the X-direction transverse beam in a positive direction, and the strain gauge R7 and the strain gauge R8 are pasted on a left side wall and a right side wall of the X-direction transverse beam in a negative direction.

6. The six-dimensional force sensor with high sensitivity and low inter-dimensional coupling according to claim 5, wherein strain gauges that form the Fz Wheatstone bridge are respectively R9, R10, R11, R12, R13, R14, R15, and R16; and the eight strain gauges are symmetrically pasted on upper surfaces and lower surfaces of four directional beams in the cross-shaped transverse beam.

7. The six-dimensional force sensor with high sensitivity and low inter-dimensional coupling according to claim 6, wherein strain gauges that form the Mx Wheatstone bridge are respectively R17, R18, R19, and R20; and the strain gauge R17 and the strain gauge R18 are pasted on an upper surface and a lower surface of a rectangular transverse beam connected to the Y-direction transverse beam in the positive direction, and the strain gauge R19 and the strain gauge R20 are pasted on an upper surface and a lower surface of a rectangular transverse beam connected to the Y-direction transverse beam in the negative direction.

8. The six-dimensional force sensor with high sensitivity and low inter-dimensional coupling according to claim 7, wherein strain gauges that form the My Wheatstone bridge are respectively R21, R22, R23, and R24; and the strain gauge R21 and the strain gauge R22 are pasted on an upper surface and a lower surface of a rectangular transverse beam connected to the X-direction transverse beam in the negative direction, and the strain gauge R23 and the strain gauge R24 are pasted on an upper surface and a lower surface of a rectangular transverse beam connected to the X-direction transverse beam in the positive direction.

9. The six-dimensional force sensor with high sensitivity and low inter-dimensional coupling according to claim 8, wherein strain gauges that form the Mz Wheatstone bridge are respectively R25, R26, R27, R28, R29, R30, R31, and R32; and the eight strain gauges are pasted in pairs on symmetrical wall surfaces of the four vertical beams.

* * * * *